US006866385B2

(12) United States Patent
Madison

(10) Patent No.: US 6,866,385 B2
(45) Date of Patent: Mar. 15, 2005

(54) FRAME CONSTRUCTION FOR EYEWEAR HAVING REMOVABLE AUXILIARY LENSES

(75) Inventor: Julie B. Madison, Hampton, VA (US)

(73) Assignee: Aspex Eyewear, Inc., Miramar, FL (US)

( * ) Notice: Subject to any disclaimer, the term of this patent is extended or adjusted under 35 U.S.C. 154(b) by 0 days.

(21) Appl. No.: 10/422,865

(22) Filed: Apr. 24, 2003

(65) Prior Publication Data

US 2003/0179342 A1 Sep. 25, 2003

Related U.S. Application Data

(62) Division of application No. 09/694,667, filed on Oct. 23, 2000, which is a continuation of application No. 08/845,125, filed on Apr. 18, 1997, now Pat. No. 6,149,269.

(51) Int. Cl.$^7$ ................................................ G02C 9/00
(52) U.S. Cl. ........................................ 351/47; 351/57
(58) Field of Search .............................. 351/47, 57, 48, 351/58, 44, 41

(56) References Cited

U.S. PATENT DOCUMENTS

| 188,246 A | 3/1877 | Johnson |
|---|---|---|
| 1,613,765 A | 1/1927 | Nemey |
| 1,679,233 A | 7/1928 | Strauss |

(List continued on next page.)

FOREIGN PATENT DOCUMENTS

| CA | 773287 | 12/1967 |
|---|---|---|
| DE | 1 797 366 | 1/1971 |
| DE | 43 16 698 A1 | 11/1994 |
| DE | 29518590 | 11/1995 |
| DE | 295 16 670 U1 | 5/1996 |
| JP | 184910 | 5/1956 |
| JP | 44-15392 | 4/1966 |
| JP | 61-2621 | 1/1986 |
| JP | 5-40493 | 10/1993 |
| JP | 7-10722 | 2/1995 |
| JP | 07-156856 | 5/1996 |
| JP | 9-101489 | 5/1996 |
| WO | WO 90/09611 | 8/1990 |

OTHER PUBLICATIONS

International Glass Design Competition '93 Japan, Oct. 5, 1993.
PR Newswire, Article published Jul. 27, 1995.
Baltimore Business Journal, Article published Jul. 28, 1995.
Takumi Oval, catalog published on or before Apr. 18, 1996; Sunreeve Co., Ltd.
Question and Answer Materials Distributed by Pentax on or about Jun. 28, 1995 and translation.
Advertisement for GIO, published on or about Oct. 5, 1993.

Primary Examiner—Hung Xuan Dang
(74) Attorney, Agent, or Firm—Knobbe, Martens Olson & Bear, LLP

(57) ABSTRACT

Eyeglasses and clip-ons are improved by providing housings for magnets for securing the clip-ons in a uniblock also incorporating one or more of the following: part of a closing block, an end piece, and part of a hinge. The structure is more compact, neater in appearance, and of improved quality as compared to eyeglasses incorporating conventional structures, and is less expensive to manufacture than many conventional eyeglasses, especially in large volume.

3 Claims, 17 Drawing Sheets

U.S. PATENT DOCUMENTS

| | | |
|---|---|---|
| 1,936,319 A | 11/1933 | Wingate |
| 2,065,122 A | 12/1936 | Diggins |
| 2,117,438 A | 5/1938 | Lindblom |
| 2,587,472 A | 2/1952 | Hoffmaster |
| D170,435 S | 9/1953 | Weissman |
| 2,737,847 A | 3/1956 | Tesauro |
| 3,531,118 A | 9/1970 | Mable et al. |
| 3,536,385 A | 10/1970 | Johnston |
| 4,070,103 A | 1/1978 | Meeker |
| 4,196,981 A | 4/1980 | Weldrop |
| 4,217,037 A | 8/1980 | Lemelson |
| D291,808 S | 9/1987 | Meyerspeer |
| D307,756 S | 5/1990 | Porsche |
| 4,958,924 A | 9/1990 | Parker |
| 4,973,148 A | 11/1990 | Gazeley |
| 5,048,944 A | 9/1991 | Porsche |
| 5,054,901 A | 10/1991 | Kaye |
| 5,080,475 A | 1/1992 | Ferron |
| 5,162,824 A | 11/1992 | Klemka |
| 5,181,051 A | 1/1993 | Townsend et al. |
| 5,243,366 A | 9/1993 | Blevins |
| 5,389,981 A | 2/1995 | Riach, Jr. |
| 5,416,537 A | 5/1995 | Sadler |
| 5,428,407 A | 6/1995 | Sheffield |
| 5,523,806 A | 6/1996 | Sakai |
| D371,567 S | 7/1996 | Fukuchi |
| 5,568,207 A | 10/1996 | Chao |
| 5,642,177 A | 6/1997 | Nishioka |
| 5,737,054 A | 4/1998 | Chao |
| 6,149,269 A | 11/2000 | Madison |

Top view

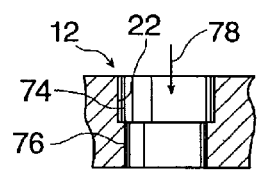
Fig. 28
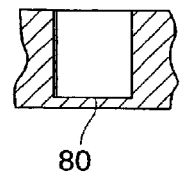
Fig. 29
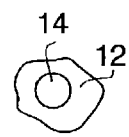
Fig. 30
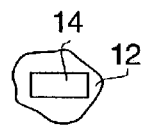
Fig. 31
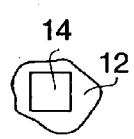
Fig. 32
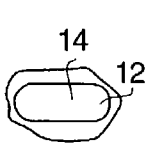
Fig. 33
Fig. 34

FRAME CONSTRUCTION FOR EYEWEAR HAVING REMOVABLE AUXILIARY LENSES

RELATED APPLICATIONS

This application is a divisional of U.S. application Ser. No. 09/694,667, which was filed on Oct. 23, 2000, which is a continuation of U.S. application Ser. No. 08/845,125, which was filed on Apr. 18, 1997 and which has issued as U.S. Pat. No. 6,149,269 on Nov. 21, 2000.

BACKGROUND OF THE INVENTION

1. Field of the Invention

This invention relates to eyeglasses and more particularly to eyeglasses having a novel and highly effective uniblock of which a portion forms a housing for a magnet or other securing means adapted to secure an auxiliary lens (with or without a frame) in place over or behind a primary lens (with or without a frame).

2. Description of the Prior Art

Eyeglasses equipped with one or more magnets adapted to secure an auxiliary lens in superimposed relation to a primary lens are known and disclosed for example in a to Chao U.S. Pat. No. 5,568,207. That patent discloses eyeglasses including primary and auxiliary frames each supporting lenses. The primary frame includes two "legs" respectively connected to two side extensions and includes two magnetic members secured in the legs. The auxiliary frame includes two legs each having a magnetic member engageable with the magnetic members of the primary frame to secure the frames together and to prevent the auxiliary frame from moving downward relative to the primary frame.

An earlier disclosure of eyeglasses having magnets for securing auxiliary lenses to primary lenses is found in a to Meeker U.S. Pat. No. 4,070,103. The Meeker patent discloses an eyeglasses frame that includes a magnetic material secured to a peripheral portion thereof for facilitating attachment of an auxiliary lens rim cover to the frame. The lens rim cover also includes a magnetic strip engageable with the magnetic material of the frame.

A to Sadler U.S. Pat. No. 5,416,537 discloses first magnetic members respectively secured to temporal portions of a primary frame and second magnetic members secured to corresponding temporal portions of auxiliary lenses.

In eyeglasses constructed in accordance with the prior art, the piecemeal assembly of closing block, end piece, magnet housing and temple-piece hinge produces a structure that is unduly strung out or elongate, and the housing for the magnet is bulky and unsightly. Since conventional eyeglasses of this type require soldering, they are also labor-intensive and expensive to manufacture, and the resulting structure is weakened by the cycles of heating and cooling, so that the frames do not hold their shape and are more likely to break. In addition, the need to assemble so many large pieces in conventional eyeglasses limits the design possibilities.

SUMMARY OF THE INVENTION

An object of the invention is to remedy the problems of the prior art noted above and in particular to provide an eyeglasses uniblock that is more attractive than corresponding structures in prior eyeglasses and less expensive than many of them.

Another object of the invention is to provide an eyeglasses uniblock that can be incorporated in a primary structure (the eyeglasses proper) or an auxiliary structure (sometimes called clip-ons, even if held by magnets instead of clips).

Another object of the invention is to provide eyeglasses and clip-ons that take advantage of the new styling possibilities afforded by the invention.

Another object of the invention is to provide eyeglasses of improved quality and stability.

The foregoing and other objects of the invention are attained in accordance with a first embodiment thereof by providing an eyeglasses uniblock comprising a portion forming a housing for securing means adapted to secure an auxiliary lens in superimposed relation to (in front of or behind) a primary lens and a portion forming a part of a closing block for securing the uniblock to a frame for one of the lenses.

In accordance with other embodiments of the invention, structures forming (1) a housing for a magnet or other securing means, (2) part of a closing block, (3) an end piece, and (4) parts of a hinge are combined in different ways, as follows:

an eyeglasses uniblock comprising a portion forming a housing for a magnet adapted to secure an auxiliary lens in superimposed relation to a primary lens and a portion forming an end piece adapted for connection to one of the lenses;

an eyeglasses uniblock comprising a portion forming a housing for a magnet adapted to secure an auxiliary lens in superimposed relation to a primary lens and a portion forming a part of a hinge for supporting a temple piece;

an eyeglasses uniblock comprising a portion forming a housing for a magnet adapted to secure an auxiliary lens in superimposed relation to a primary lens, a portion forming a part of a closing block for securing the uniblock to one of the lenses, and a portion forming an end piece adapted for connection to said one of the lenses;

an eyeglasses uniblock comprising a portion forming a housing for a magnet adapted to secure an auxiliary lens in superimposed relation to a primary lens, a portion forming an end piece adapted for connection to the primary lens, and a portion forming a part of a hinge for supporting a temple piece;

an eyeglasses uniblock comprising a portion forming a housing for a magnet adapted to secure an auxiliary lens in superimposed relation to a primary lens, a portion forming a part of a closing block for securing the uniblock to the primary lens, a portion forming an end piece adapted for connection to a primary lens, and a portion forming a part of a hinge for supporting a temple piece.

In accordance with other embodiments of the invention, eyeglasses are provided comprising different combinations of features, as follows:

first and second primary lenses and first and second uniblocks, the first uniblock comprising a portion forming a first housing for a first magnet adapted to secure auxiliary lenses in superimposed relation to primary lenses and a portion forming a part of a first closing block for securing the first uniblock to the first primary lens; and the second uniblock comprising a portion forming a second housing for a second magnet adapted to secure auxiliary lenses in superimposed relation to the primary lenses and a portion forming a part of a second closing block for securing the second uniblock to the second primary lens;

first and second primary lenses, first and second uniblocks, third and fourth auxiliary lenses, and third and fourth uniblocks, wherein: the first uniblock comprises a portion forming a first housing for a first magnet adapted to secure the auxiliary lenses in superimposed relation to the primary lenses and a portion forming a part of a first closing block for securing the first uniblock to the first primary lens; the second uniblock comprises a portion forming a second housing for a second magnet adapted to secure the auxiliary lenses in superimposed relation to the primary lenses and a portion forming a part of a second closing block for securing the second uniblock to the second primary lens; the third uniblock comprises a portion forming a third housing for a third magnet adapted to secure the auxiliary lenses in superimposed relation to the primary lenses and a portion forming a part of a third closing block for securing the third uniblock to the third auxiliary lens; and the fourth uniblock comprises a portion forming a fourth housing for a fourth magnet adapted to secure the auxiliary lenses in superimposed relation to the primary lenses and a portion forming a part of a fourth closing block for securing the fourth uniblock to the fourth auxiliary lens.

In accordance with another embodiment of the invention, there are provided, in combination, an upper eyeglasses uniblock comprising a portion forming a housing for a magnet adapted to secure an auxiliary lens in superimposed relation to a primary lens and a portion forming a part of a closing block; and a lower eyeglasses uniblock, the upper and lower uniblocks being joined together in superimposed relation to form a composite structure.

BRIEF DESCRIPTION OF THE DRAWINGS

A better understanding of the objects, features and advantages of the invention can be gained from a consideration of the following detailed description of the preferred embodiments of the invention, in conjunction with the appended figures of the drawing, wherein:

FIGS. 28 and 29 are views in axial section of two embodiments of a magnet housing constructed in accordance with the invention;

FIG. 30 is a view in a direction at a right angle to the views of FIGS. 28 and 29, and, showing the shape of a bar magnet and magnet housing as seen by an observer of one embodiment of the invention;

FIGS. 31–34 are views similar to FIG. 32 showing housing and, magnet shapes in other embodiments of the invention;

DETAILED DESCRIPTION OF THE PREFERRED EMBODIMENT

Figure 1:
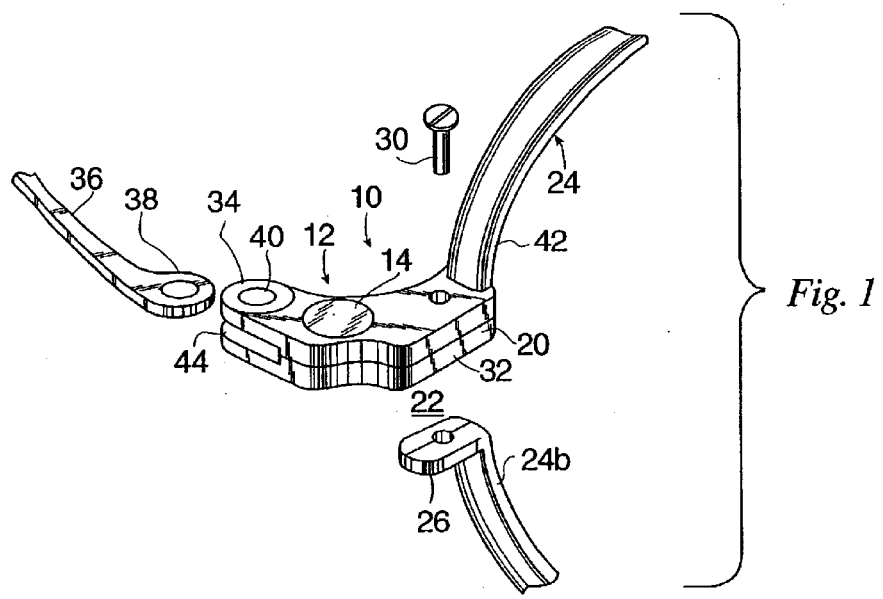
FIG. 1 is a perspective view from above of a first embodiment of the invention.

FIG. 1 is an exploded perspective view from above of a first embodiment of structure including an eyeglasses uniblock 10 constructed in accordance with the invention. The uniblock 10 is a cast structure and comprises a housing 12 for a magnet 14 adapted to secure an auxiliary lens 16 over a primary lens 18 (both illustrated for example in FIG. 13). Instead of the magnet 14, snaps, slides, notches, clips or other securing means (not illustrated) can be employed. Instead of being cast, the uniblock 10 can be extruded or stamped.

The uniblock 10 also comprises a portion 20 forming a part of a closing block 22 for securing the uniblock 10 to one of the lenses, for example the primary lens 18. The closing block 22 secures the uniblock 10 to a lens since the portion 20 is connected to one end 24a (FIG. 1) of a frame or rim 24 that surrounds the lens. The other end 24b of the rim 24 has a flange 26 that fits into a recess 28 (FIG. 2) on the part 20 and is secured by a screw or pin 30.

The uniblock 10 of FIG. 1 incorporates, as part of the same one-piece cast structure, an end piece 32 providing a neat appearance.

The uniblock 10 also comprises a portion 34 forming a part of a hinge for supporting a temple piece 36. The temple piece 36 has an opening 38 that aligns with openings 40, 42 (FIGS. 1 and 2) in the hinge part 34 and is inserted within a slot 44 formed in the hinge part 34. A pin or screw 48 (FIG. 3) is inserted to hold the temple piece 36 in position and allow for its pivoting movement about the pin 48, so that the temple piece 36 and a companion temple piece on the other side of the eyeglasses can be folded for storage of the eyeglasses in a case, pocket, purse or drawer, etc., or opened for use. The invention is also adapted to be used with a hinge that does not employ a pin or screw.

Figure 2:
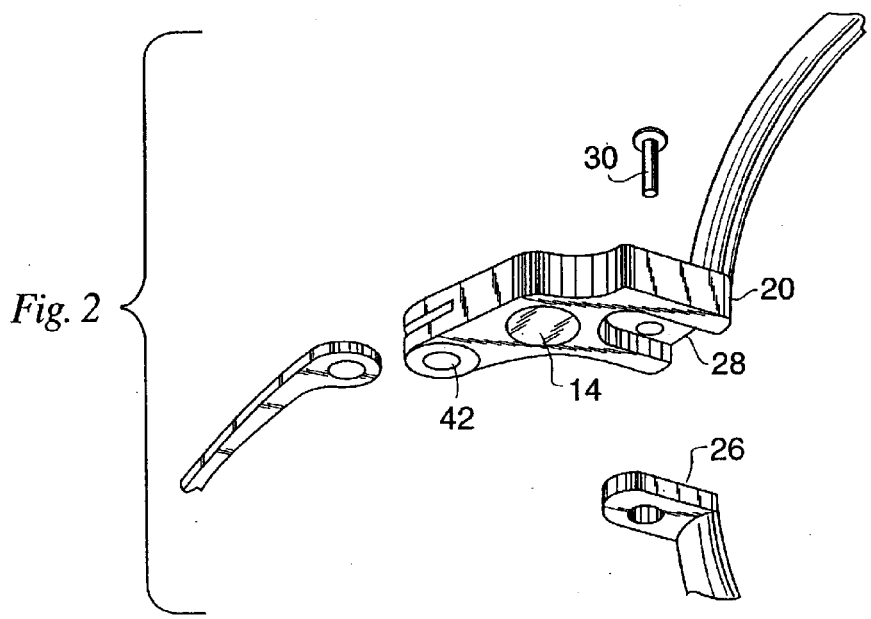
FIG. 2 is a perspective view from below of the structure shown in FIG. 1.
Figure 3:
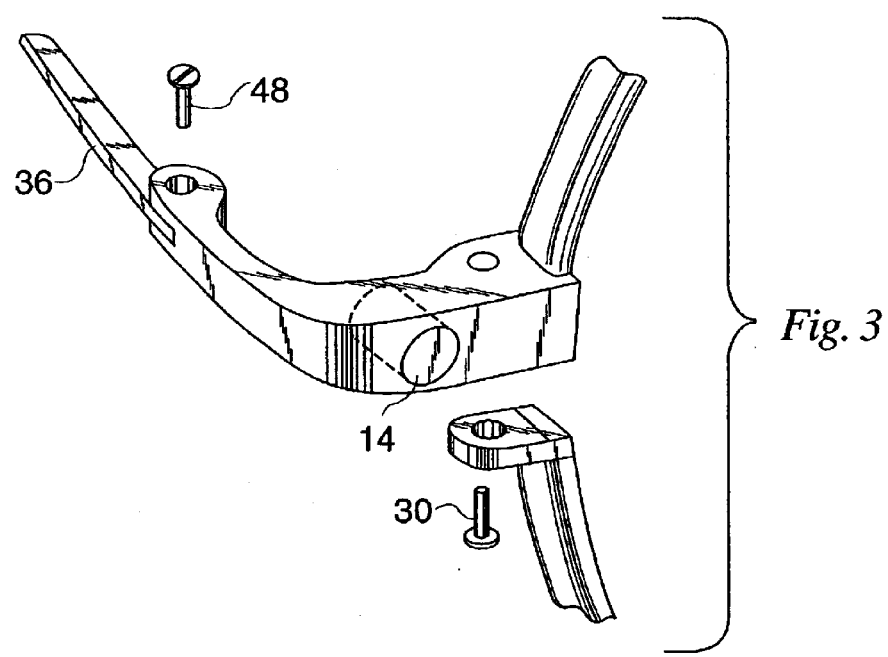
FIG. 3 is a perspective view from above of another embodiment of the invention.

In FIGS. 1 and 2 the magnet 14, which is a bar magnet, is oriented with its axis vertical; in FIG. 3, it is oriented with its axis horizontal. It is also within the scope of the invention to employ horseshoe magnets and magnets of other designs. In FIGS. 1 and 2, the pin or screw 30 is inserted from above, and in FIG. 3 it is inserted from below. Other orientations of the magnet, and the use of securing means other than pins and screws are within the scope of the invention.

Figure 4:
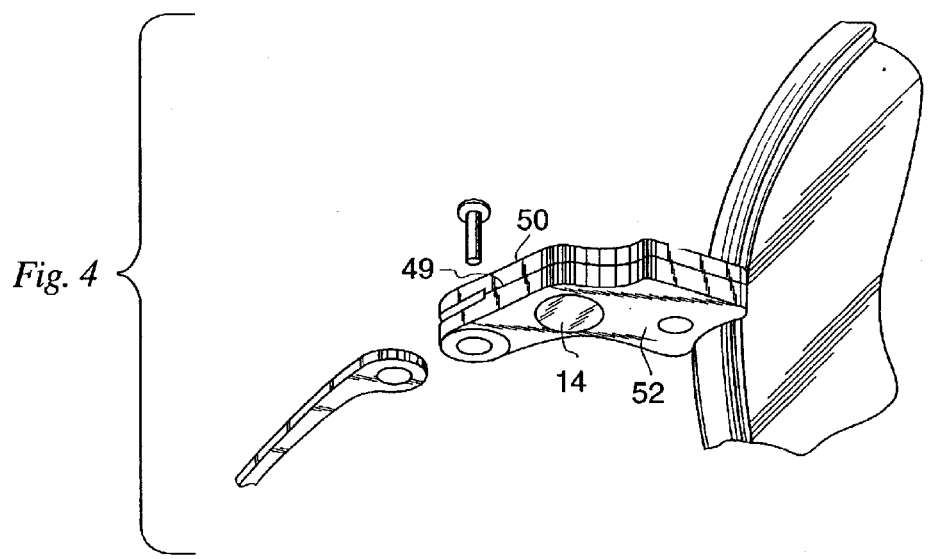
FIG. 4 is a perspective view from below of another embodiment of the invention.
Figure 5:
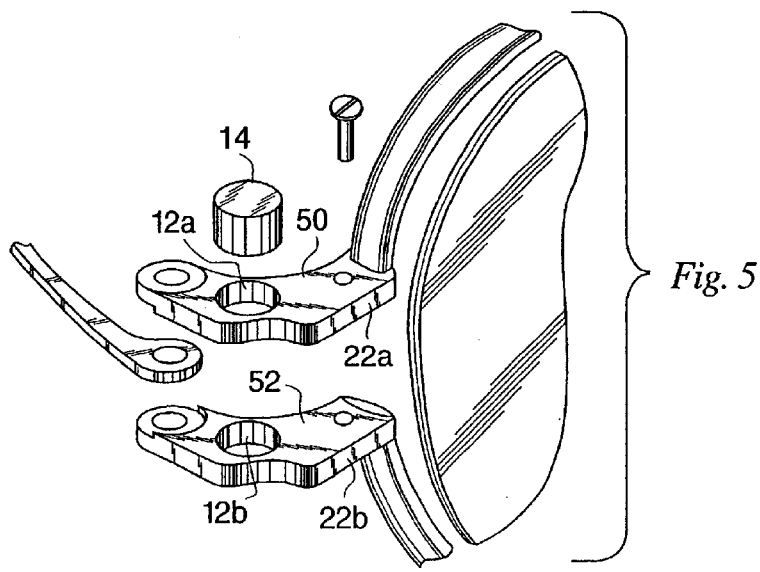
FIG. 5 is an exploded perspective view from above of the structure shown in FIG. 4.

In FIGS. 4 and 5, the same parts are shown as in FIGS. 1–3, but they are split along a horizontal plane 49 into an upper eyeglasses uniblock 50 comprising a portion forming a housing 12a for a magnet 14 adapted to secure an auxiliary lens in superimposed relation to a primary lens and a portion 22a forming a part of a closing block; and a lower eyeglasses uniblock 52, the upper and lower uniblocks 50, 52 being joined together in superimposed relation by a pin or screw 20 to form the composite structure shown in FIG. 4. In FIGS. 4 and 5, the lower uniblock 52 includes a portion 12b forming a housing for the magnet 14 and a portion 22b forming a part of the closing block. The uniblock can be produced by casting, stamping or extruding depending on the shape used and degree cost savings required.

Figure 6:
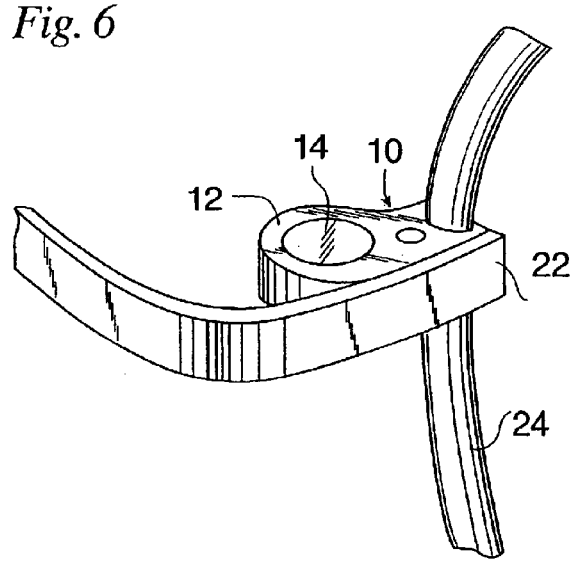
FIG. 6 is a perspective view from above of another embodiment of the invention.
Figure 7:
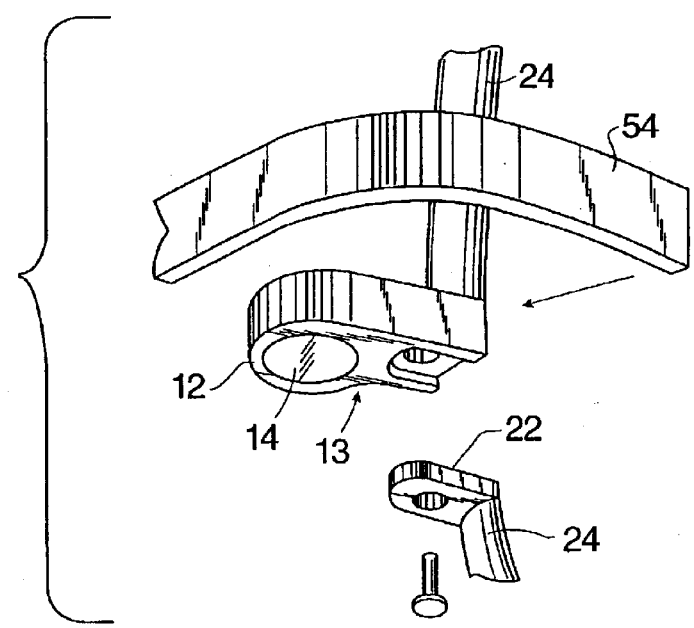
FIG. 7 is an exploded perspective view from below of the structure illustrated in FIG. 6.

In FIGS. 6 and 7, the eyeglasses uniblock 10 comprises a portion forming a housing 12 for a magnet 14 adapted to secure an auxiliary lens in superimposed relation to a primary lens and a portion forming a part of a closing block 22 for securing the uniblock 10 to one of the lenses. A separate end piece 54 is provided for neatness and is soldered in place. In FIGS. 6 and 7, the uniblock is secured temporally to one of the lenses (since it is attached temporally to a rim that surrounds the lens).

Figure 8:
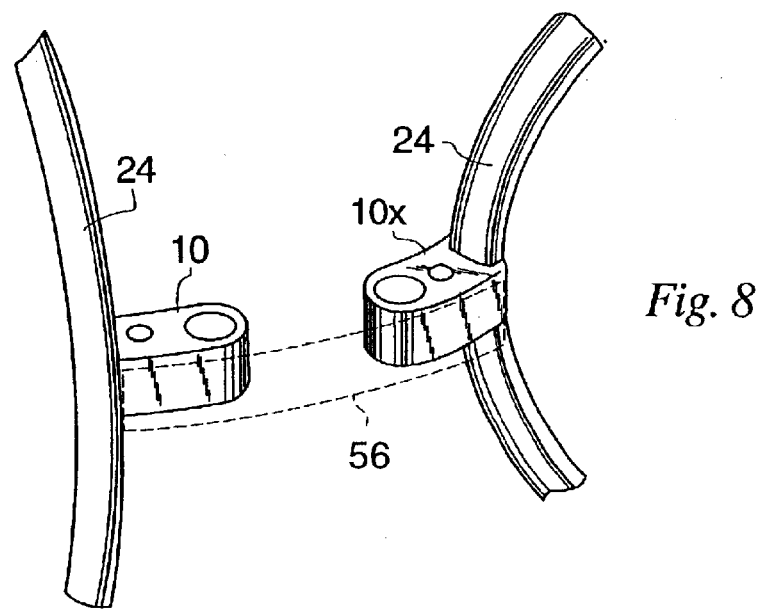
FIG. 8 is a perspective view from above of another embodiment of the invention.

In FIG. 8, the uniblock 10 is attached nasally to one of the lenses (since it is attached to a frame 24 that surrounds the lens). FIG. 8 also shows a second uniblock 10x similarly attached to the other lens (since it is attached to a frame 24x that surrounds the other lens). A bridge 56 connects the uniblocks 10 and 10x.

Figure 9:
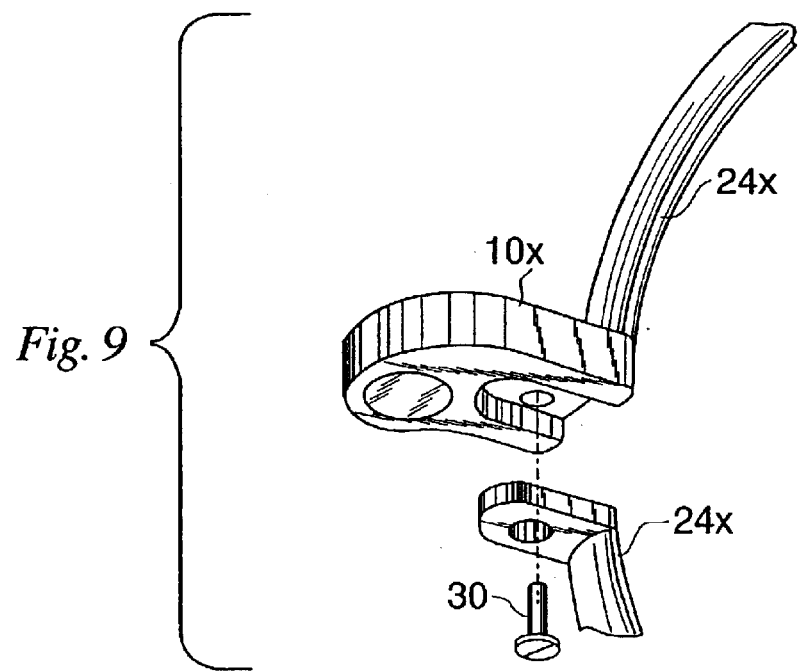
FIG. 9 is an exploded perspective from below of a portion of the structure illustrated in FIG. 8.

FIG. 9 is an exploded perspective view from below showing the manner in which the structure is assembled. A screw 30 is inserted from below to secure the closing block.

Figure 10:
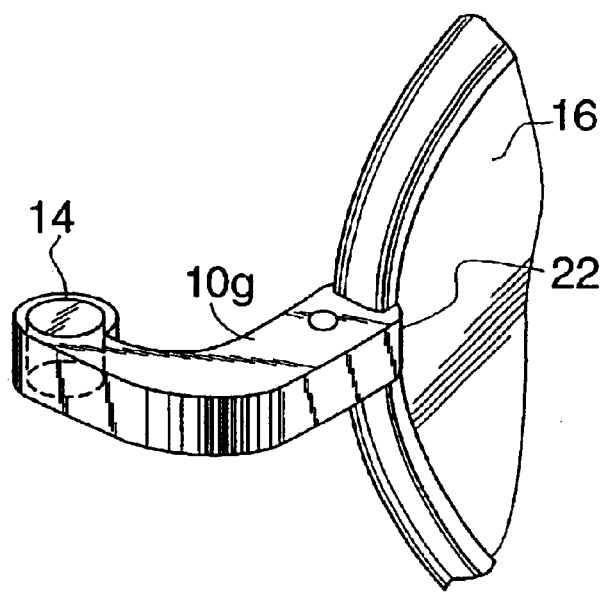
FIG. 10 is a perspective view from above of another embodiment of the invention.

FIG. 10 shows an embodiment of a uniblock 10y applicable to an auxiliary lens 16. It shows a portion forming a housing for a magnet 14 adapted to secure an auxiliary lens in superimposed relation to a primary lens and a portion forming a part of a closing block 22 for securing the uniblock 10y to one of the auxiliary lenses 16.

Figure 11:
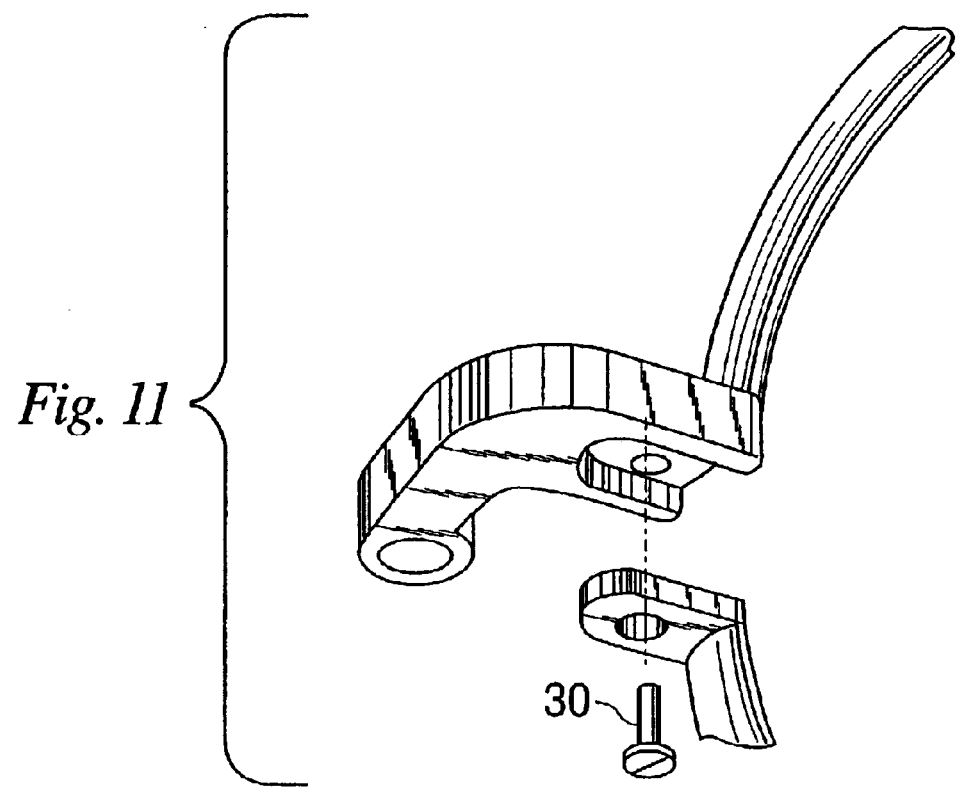
FIG. 11 is an exploded perspective view from below of the structure shown in FIG. 10.

FIG. 11 is an exploded perspective view showing the structure from below, including a screw 30 that secures the closing block 22.

Figure 12:
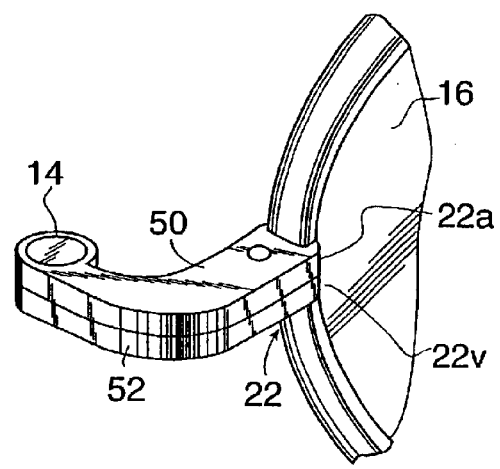
FIG. 12 is a perspective view from above of another embodiment of the invention.

FIG. 12 shows the combination of an upper eyeglasses uniblock 50 comprising a portion forming a housing for a magnet 14 adapted to secure an auxiliary lens 16 in superimposed relation to a primary lens and a portion 22a forming a part of a closing block 22; and a lower eyeglasses uniblock 52 comprising a portion forming a housing for the magnet 14 and a portion 22b forming a part of the closing block 22, the upper and lower uniblocks 50, 52 being joined together in superimposed relation to form a composite structure. In this case, the structure is applied to an auxiliary lens.

Figure 13:
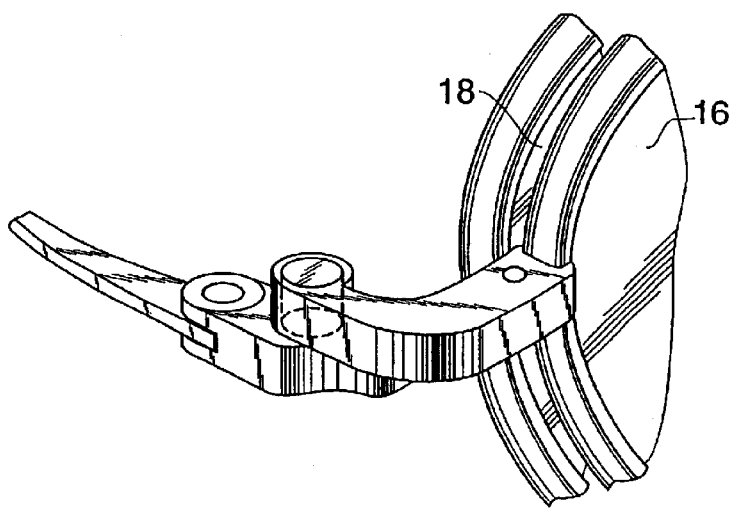
FIG. 13 is a perspective view from above of another embodiment of the invention.
Figure 14:
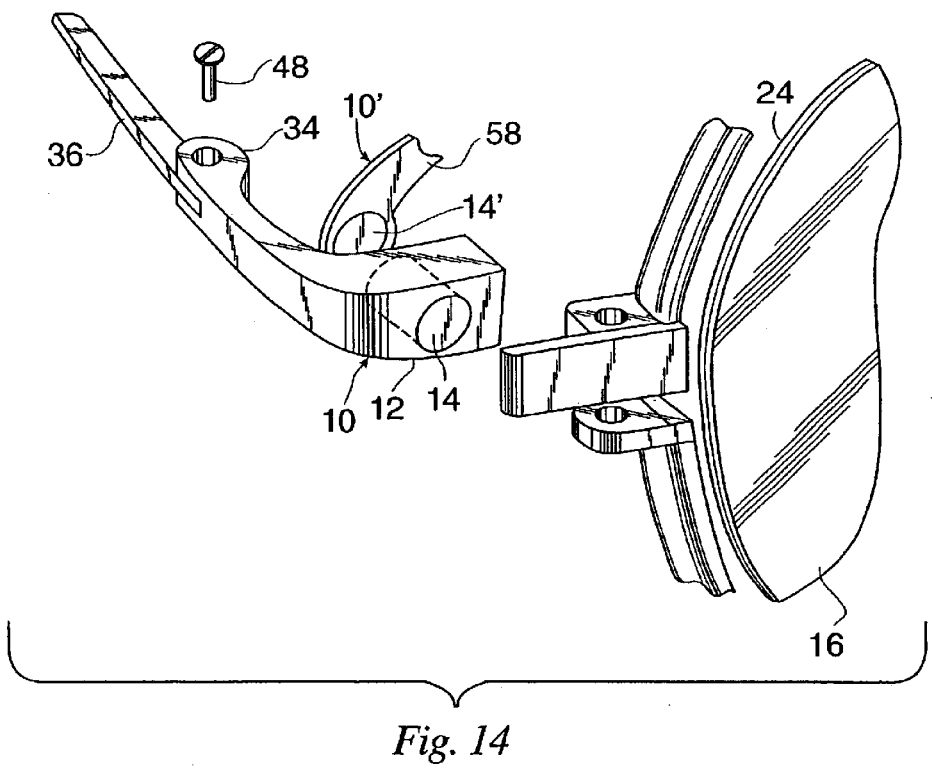
FIG. 14 is an exploded perspective view from above of another embodiment of the invention.
Figure 15:
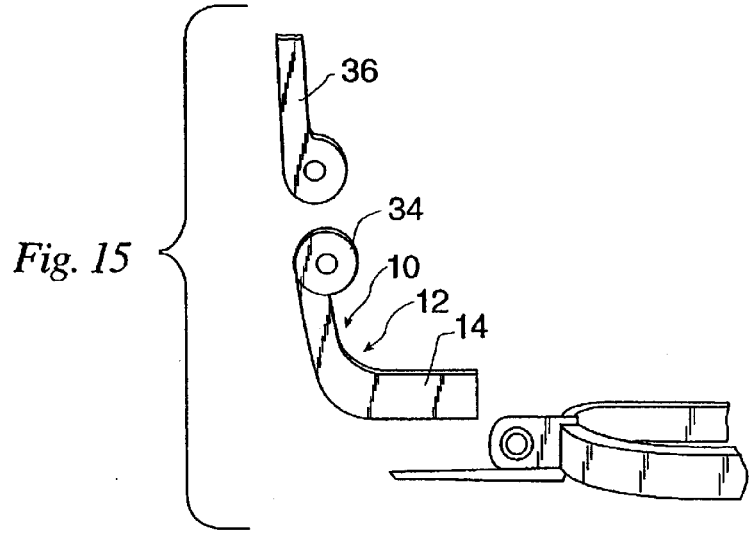
FIG. 15 is an exploded top view of the structure shown in FIG. 14.

FIG. 13 shows the cooperation of a primary lens 18, a uniblock associated therewith, a secondary lens 16, and a uniblock associated therewith. Each of the uniblocks comprises a portion forming a housing for a magnet adapted to secure an auxiliary lens in superimposed relation to a primary lens and a portion forming a part of a closing block for securing the uniblock to one of the lenses. The two magnets are opposed north pole to south pole, so that they attract. It is also within the scope of the invention to employ a magnet in one of the uniblocks opposed to a ferromagnetic material in the other uniblock. It forms a more secure attachment, however, if two, magnets are employed and juxtaposed as indicated above.

In practice, of course, in the preferred embodiments of the invention four magnets are employed altogether, two on either side of the eyeglasses.

Figure 16:
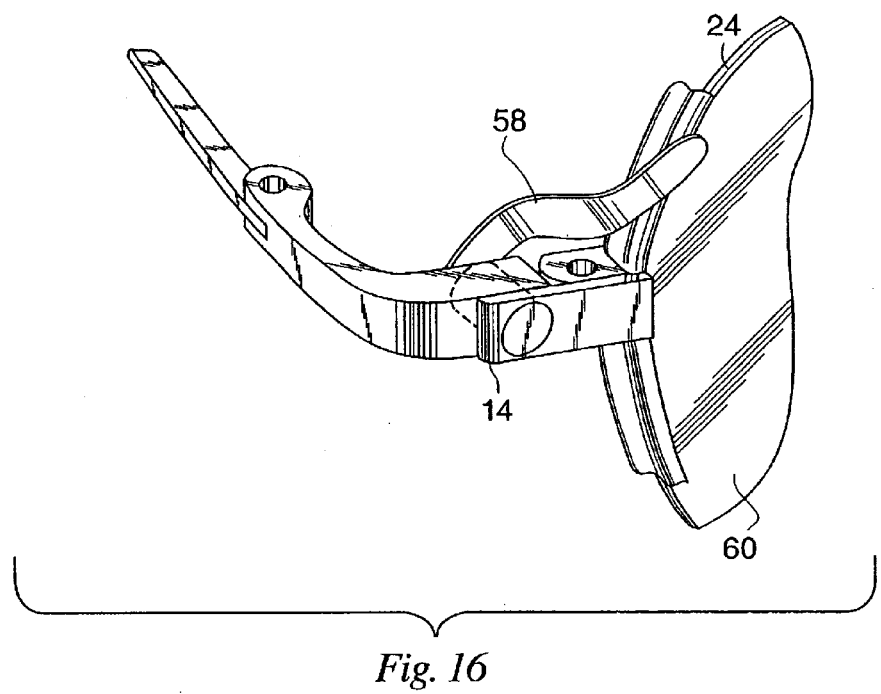
FIG. 16 is an assembled perspective view from above of the structure of FIGS. 14 and 15.
Figure 17:
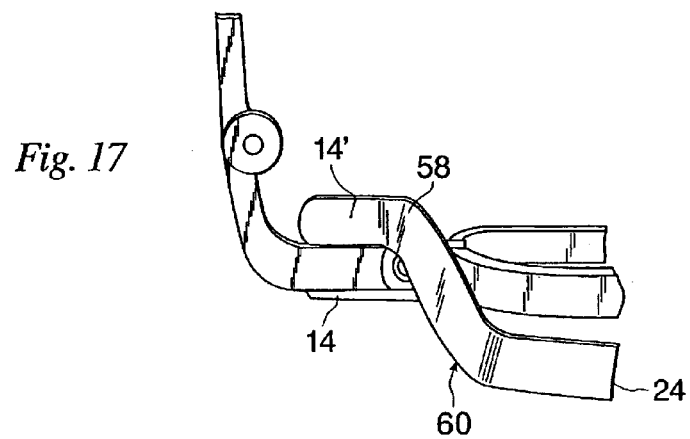
FIG. 17 is a top view of the structure shown in FIG. 16.

FIGS. 14–17 show an eyeglasses uniblock 10 comprising a portion forming a housing 12 for a magnet 14 adapted to secure an auxiliary lens in superimposed relation to a primary lens and a portion 34 forming a part of a hinge for supporting a temple piece 36. A clip-on 60 has a magnet 14' supported by an arm 58 forming part of a uniblock 10' attached to the auxiliary lens 16 (through its frame 24). The magnetic housings for the two uniblocks 10, 10' are shaped so that each magnet is oriented with its axis horizontal. The arm 58 passes over the uniblock 10 for the primary lens and is connected from the rear. FIGS. 16 and 17 show the structure in assembled relation.

Figure 18:
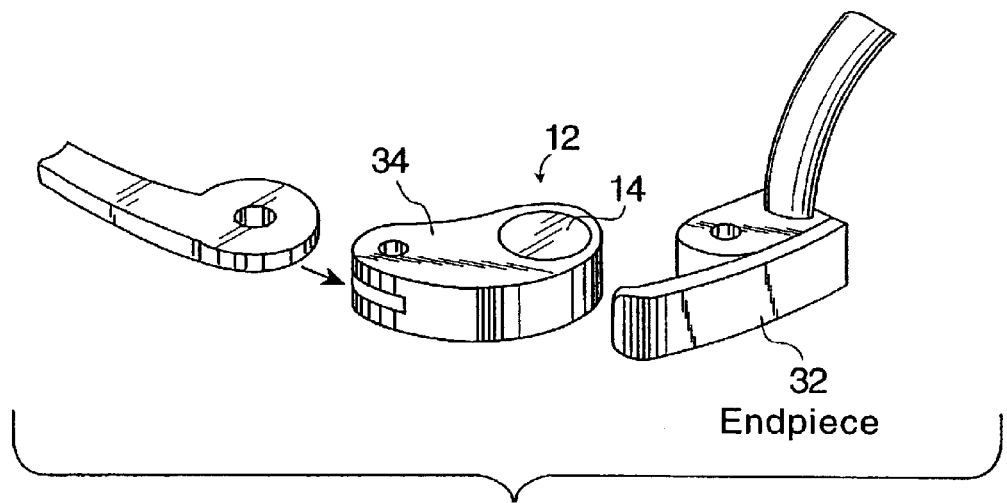
FIG. 18 is an exploded perspective view from above of another embodiment of the invention.

FIG. 18 shows the portion forming a magnet housing 12 and a portion 34 forming a part of a hinge covered by a separate end piece 32 soldered in place. The magnet axis is vertical.

The structures of FIGS. 14–18 are illustrated with frames, but it is within the scope of the invention to attach the uniblocks shown in those figures to a separate end piece which is attached to the lens directly, not through a frame surrounding the lens.

Figure 19:
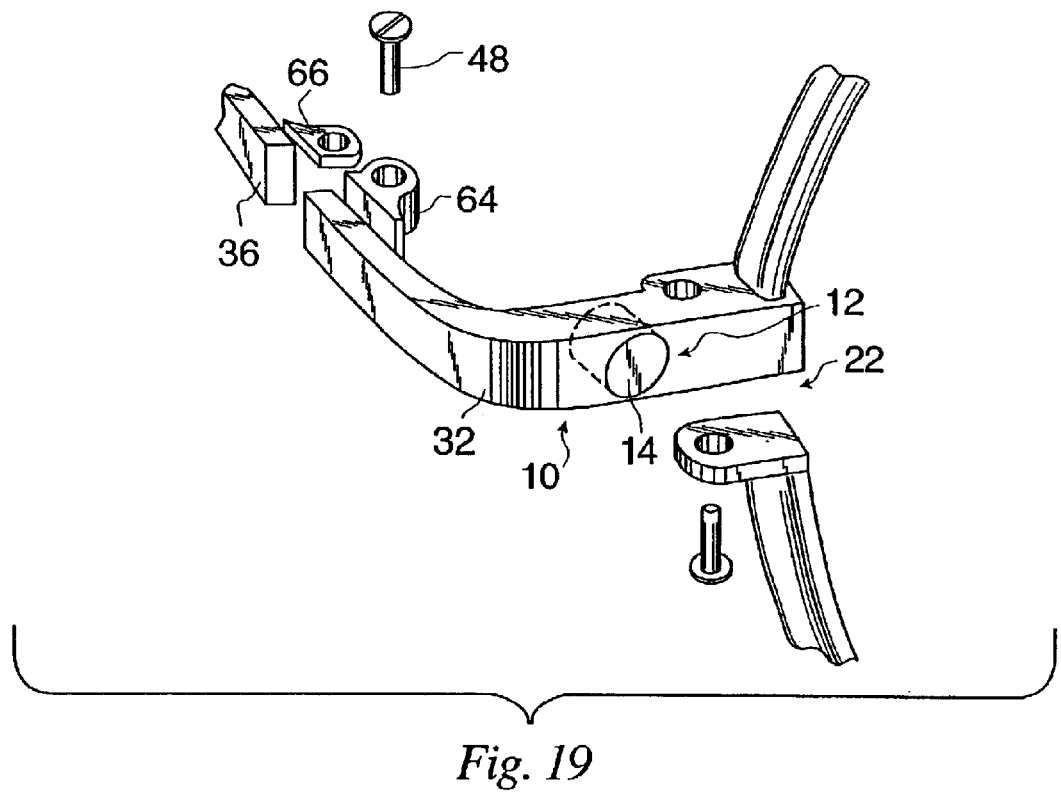
FIG. 19 is an exploded perspective view from above of another embodiment of the invention.
Figure 20:
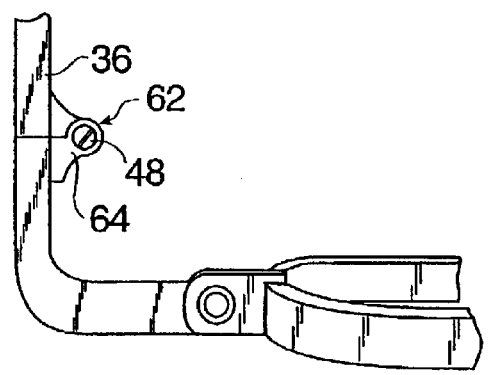
FIG. 20 is a top view of the structure shown in FIG. 19.

FIGS. 19 and 20 show an eyeglasses uniblock 10 comprising a portion forming a housing 12 for a magnet 14 adapted to secure an auxiliary lens in superimposed relation to a primary lens, a portion forming a part of a closing block 22 for securing the uniblock to one of the lenses, and a portion 32 forming an end piece adapted for connection to said one of the lenses. The magnet 14 has its axis oriented horizontally. A separate hinge 62 is provided, comprising a part 64 attached to the uniblock 10, a part 66 attached to the temple piece 36, and a pin or screw 48 passing through aligned apertures in the two parts. FIG. 20 shows the assembled structure as it appears from the top.

Figure 21:
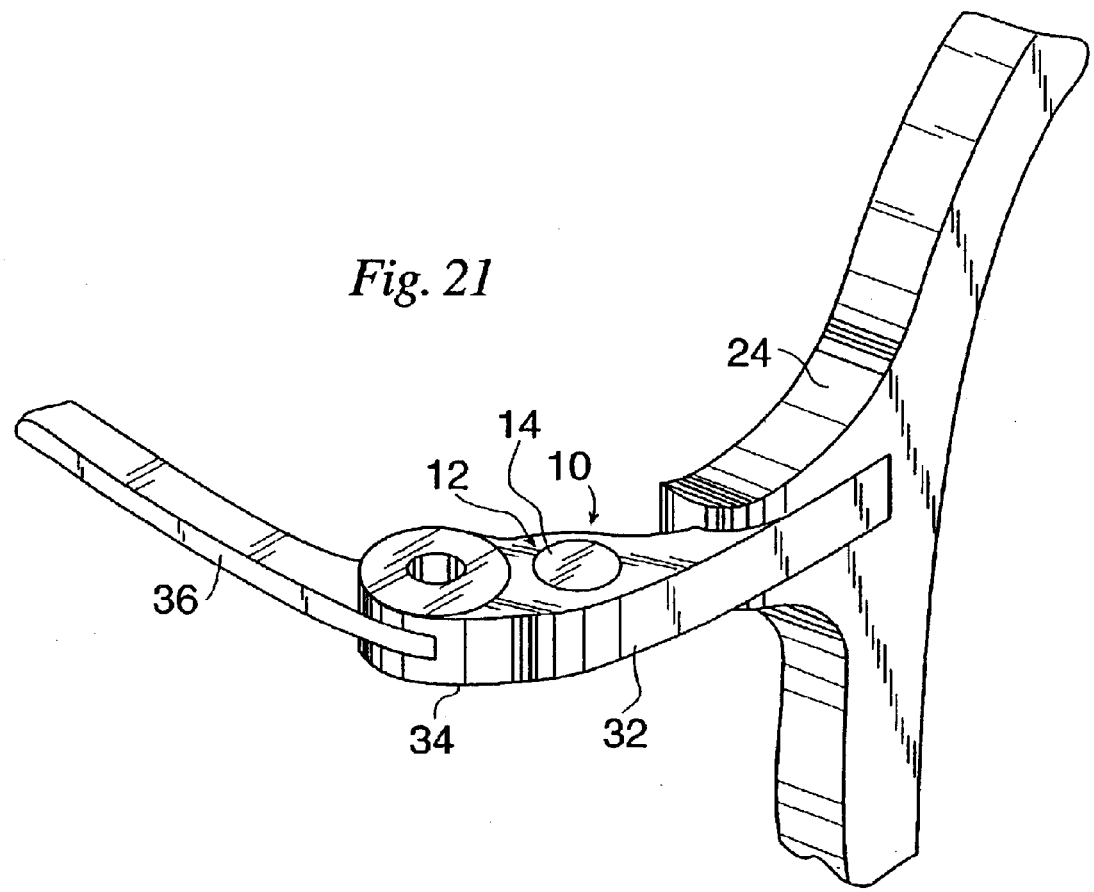
FIG. 21 is a perspective view from above of another embodiment of the invention.

FIG. 21 shows an eyeglasses uniblock 10 comprising a portion forming a housing 12 for a magnet 14 adapted to secure an auxiliary lens in superimposed relation to a primary lens, a portion forming an end piece 32 adapted for connection to the primary lens, and a portion 34 forming a part of a hinge for supporting a temple piece 36. The uniblock is cast and especially adapted for use with an acetate frame.

Figure 22:
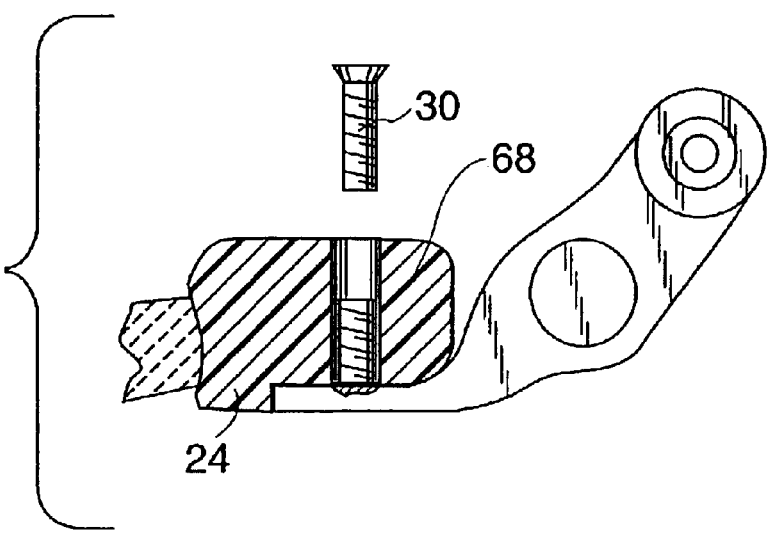
FIG. 22 is a bottom view, partly in section, of the structure shown in FIG. 21.

FIG. 22 is a view from the bottom, partly in section, showing a pin or screw 30 inserted from the rear in a dead-end cylindrical hole 68 for securing the uniblock 10 to the frame 24.

Figure 23:
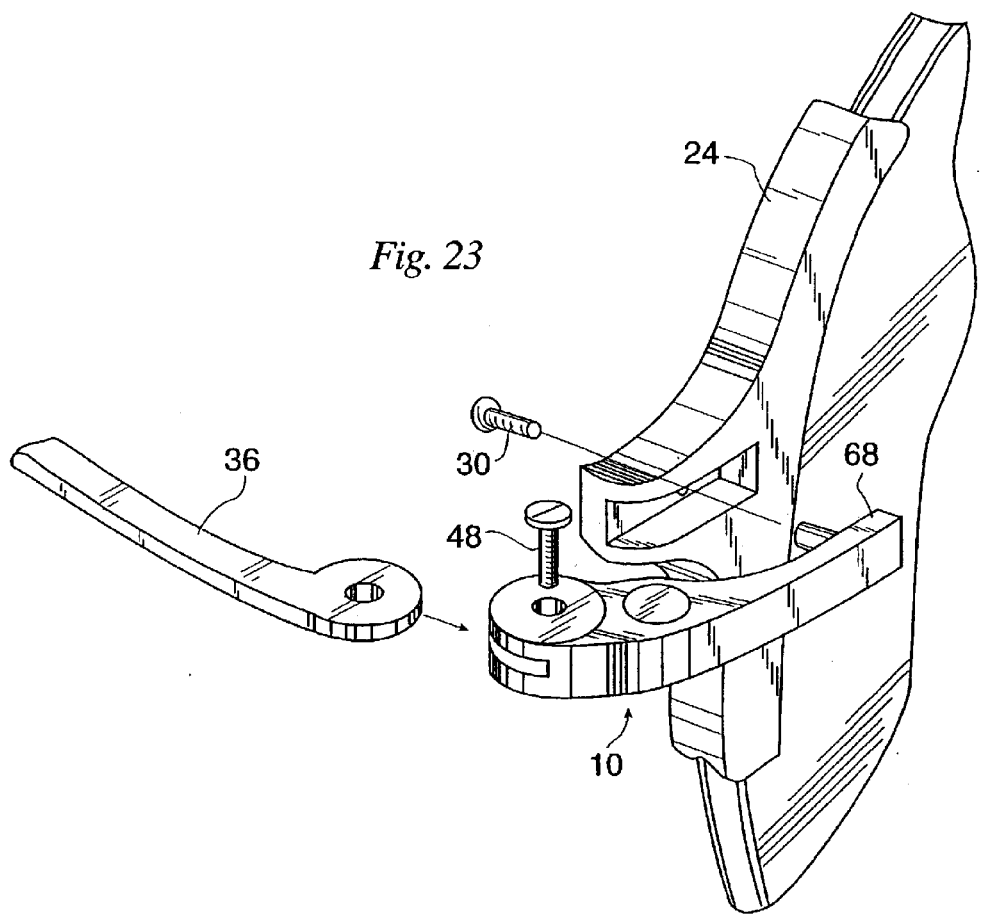
FIG. 23 is an exploded perspective view from above of the structure of FIG. 21.

FIG. 23 is an exploded view of the uniblock 10 showing how it is assembled with the frame 24 by a pin or screw 30 and with the temple piece 36 by a pin or screw 48.

Figure 24:
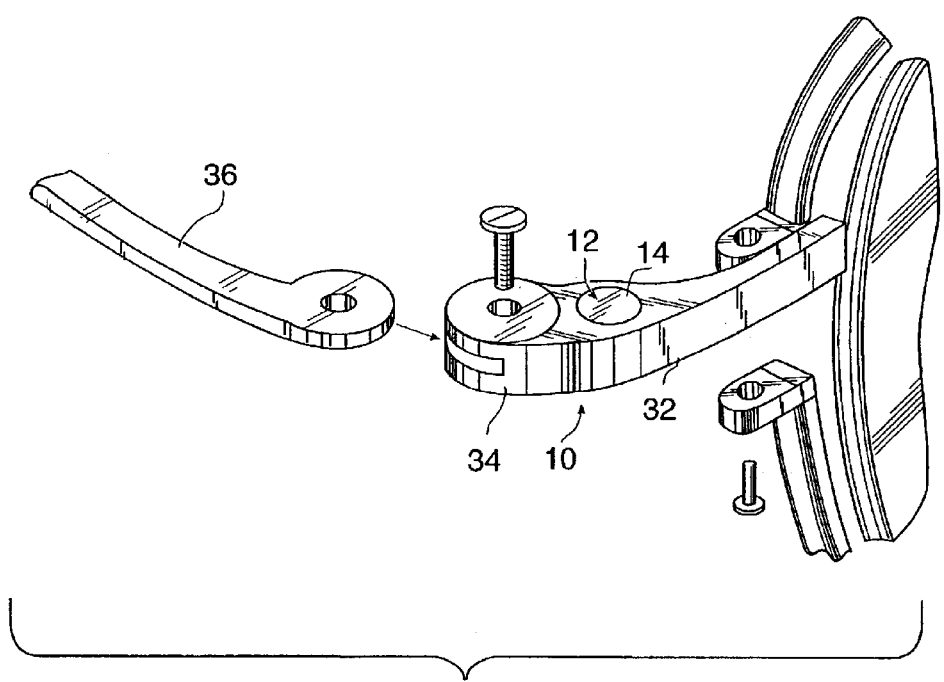
FIG. 24 is an exploded perspective view from above of another embodiment of the invention.

FIG. 24 shows a uniblock 10 comprising a portion forming a housing 12 for a magnet 14 adapted to secure an auxiliary lens in superimposed relation to a primary lens, a portion forming an end piece 32 adapted for connection to the primary lens, and a portion 34 forming a part of a hinge for supporting a temple piece 36. The uniblock of FIG. 24 is especially adapted for use with a metal frames.

Figure 25:
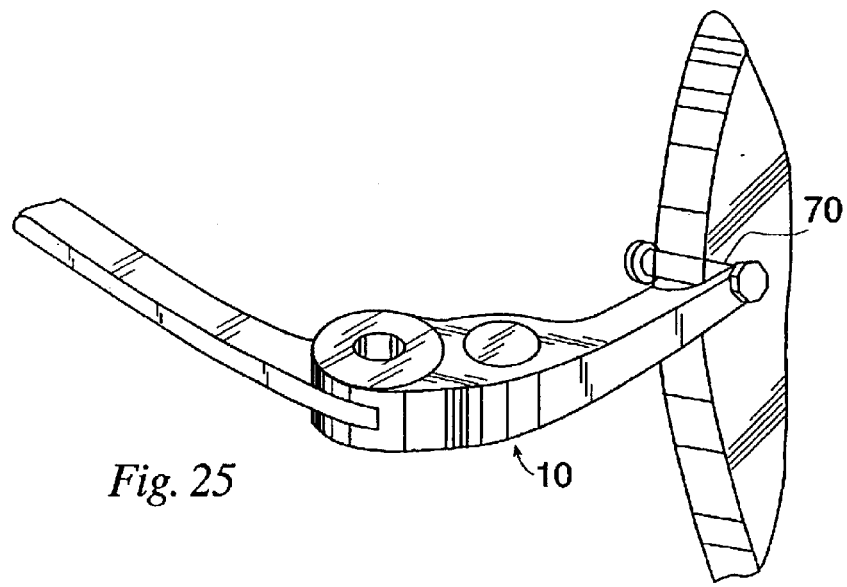
FIG. 25 is a perspective view from above of another embodiment of the invention.

FIG. 25 shows a uniblock 10 having the same three elements constructed as a three-piece mount (mounted temporally without a frame). In this case, the uniblock 10 is attached to a post 70 that extends through the lens.

Figure 26:
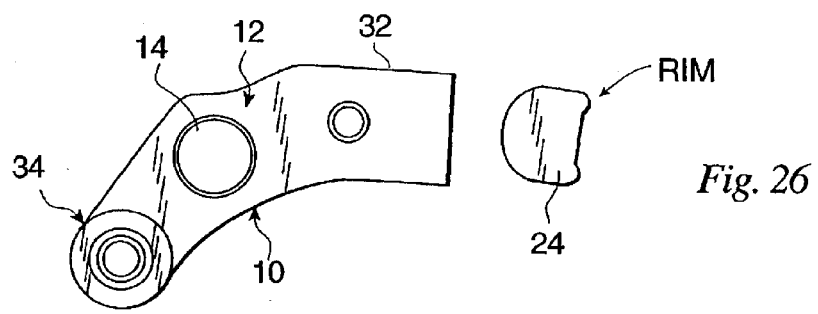
FIG. 26 is a top view of a left uniblock constructed in accordance with the invention.

FIG. 26 is a top view of a left eyeglasses uniblock 10 comprising a portion forming a housing 12 for a magnet 14, a portion 32 forming an end piece, and a portion 34 forming a part of a hinge. The uniblock 10 is attached to a rim 24.

Figure 27:
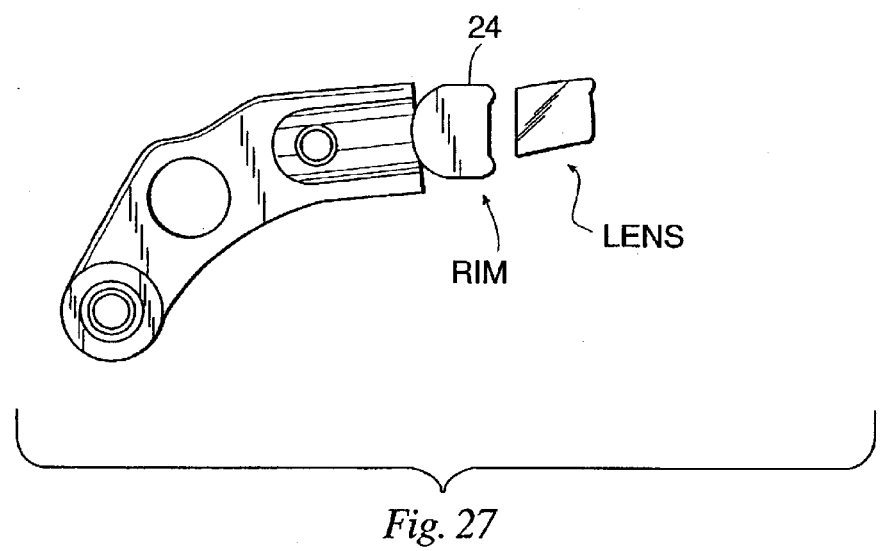
FIG. 27 is a bottom view of a right uniblock constructed in accordance with the invention and forming a pair with the uniblock of FIG. 26.
Figure 35:
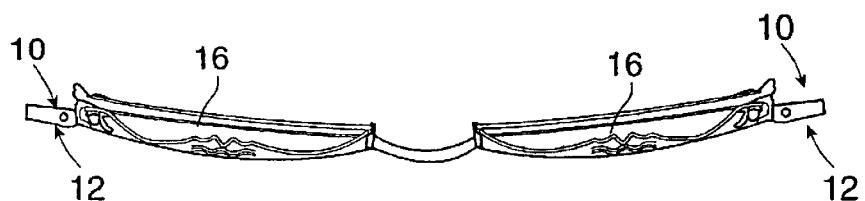
FIGS. 35 and 36 are respectively top and front views of one embodiment of auxiliary lenses constructed in accordance with the invention.
Figure 36:
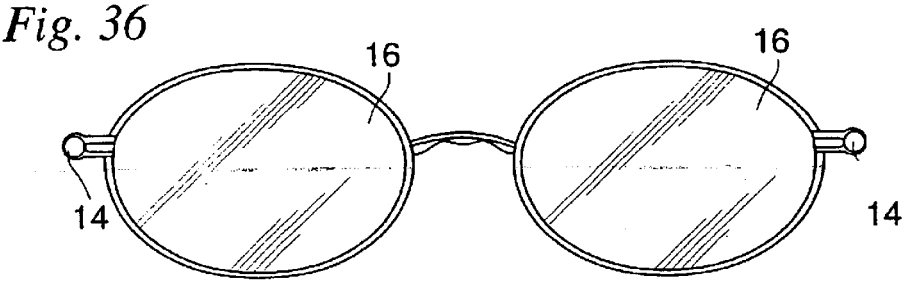
Figure 37:
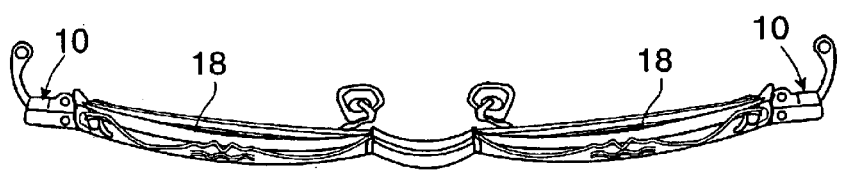
FIGS. 37 and 38 are respectively top and front views of the auxiliary lenses of FIGS. 35 and 36 secured in superimposed relation to compatibly designed primary eyeglasses constructed in accordance with the invention.
Figure 38:
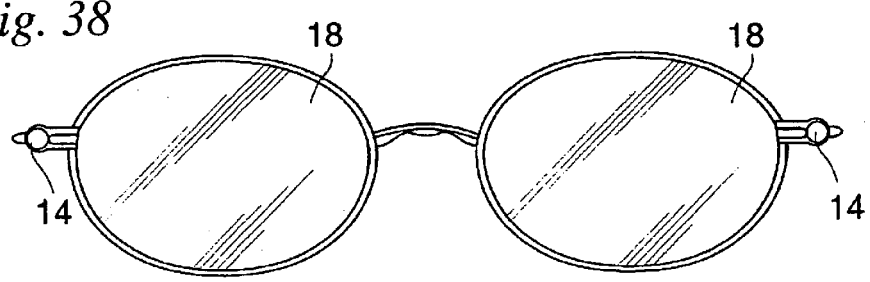

FIG. 27 is a bottom view of a right eyeglasses uniblock 10 forming a pair with the uniblock of FIG. 26. FIG. 27 also shows a lens.

FIG. 28 shows a housing 12 for a magnet. The housing 12 has a portion 72 of a diameter approximately equal to the diameter of the magnet. A shoulder 74 separates the housing portion 72 from another housing portion 76 having a diameter slightly smaller than the diameter of the magnet. The magnet is inserted from one side in the direction of the arrow 78 and is forced into the portion 76 having the smaller diameter, so that it is retained securely.

FIG. 29 is a sectional view of a magnet housing 12 closed at one end 80 and having a uniform diameter. The magnet can be seated at 80 with the aid of an adhesive such as epoxy, or forced in place.

FIGS. 30–34 respectively show housings shaped to accommodate magnets that are respectively round, rectangular, square, elliptical and oval, as viewed in a direction parallel to the axes of the magnets.

FIGS. 35–38 show eyeglasses and auxiliary lenses mounted together in accordance with the present invention.

Thus there is provided in accordance with the invention eyeglasses having a novel and highly effective uniblock of which a portion forms a housing for a magnet or other securing means adapted to secure an auxiliary lens in superimposed relation to a primary lens. Many modifications of a preferred embodiments disclosed herein will readily occur to those skilled in the art. The invention includes all embodiments thereof that fall within the scope of the appended claims.

What is claimed is:

1. Eyewear comprising a frame having a first lens and a second lens supported therein, a first attachment housing extending from said frame adjacent said first lens, a second attachment housing extending from said frame adjacent said second lens, a pair of temples hingedly connected to respective ones of said attachment housings and extending rearwardly from said frame to secure said eyewear on a user thereof, each of said attachment housings having an upwardly directed surface and a downwardly directed surface, each of said downwardly directed surfaces having a bore formed therein with a wall defining said bore being stepped to provide different diameters along said bore, a first magnetic member located within said bore of said first attachment housing and a second magnetic member located within said bore of said second attachment housing, said magnetic members being adapted to secure auxiliary lenses in superimposed relation to said first and second lenses.

2. Eyewear according to claim 1 wherein said magnetic member is retained in the portion of the bore of smaller diameter.

3. Eyewear according to claim 1 wherein said first magnetic member is embedded within said bore of said first attachment housing and said second magnetic member is embedded within said bore of said second attachment housing.

* * * * *